T. J. SULLIVAN.
HOUSE SERVICE VALVE.
APPLICATION FILED JUNE 9, 1920.
1,384,645.
Patented July 12, 1921.
2 SHEETS—SHEET 1.
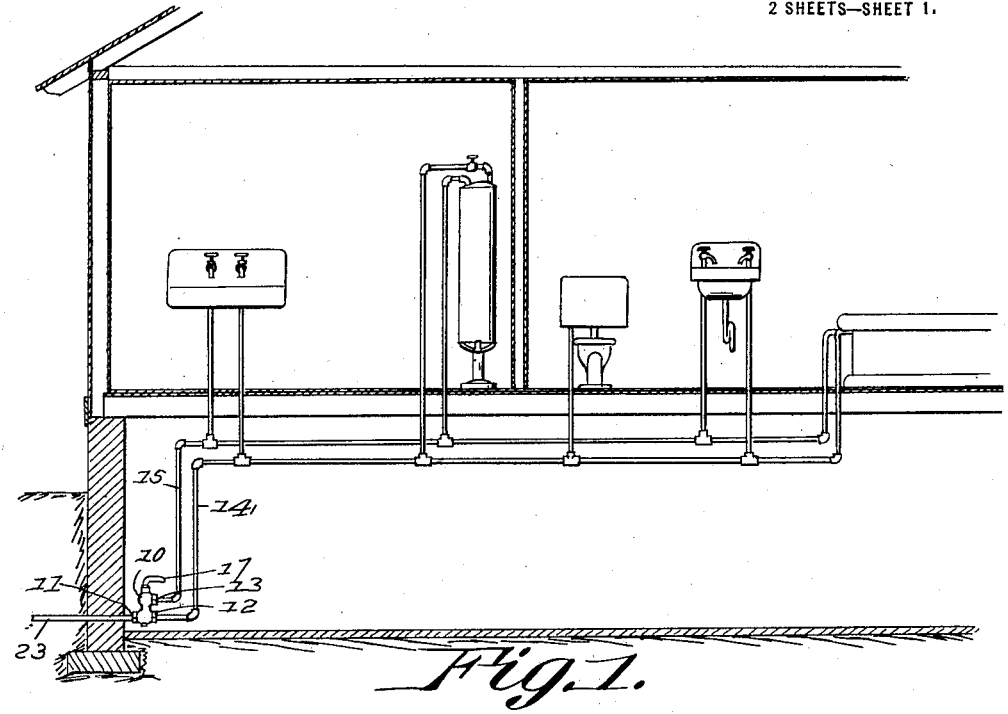
Fig. 1.
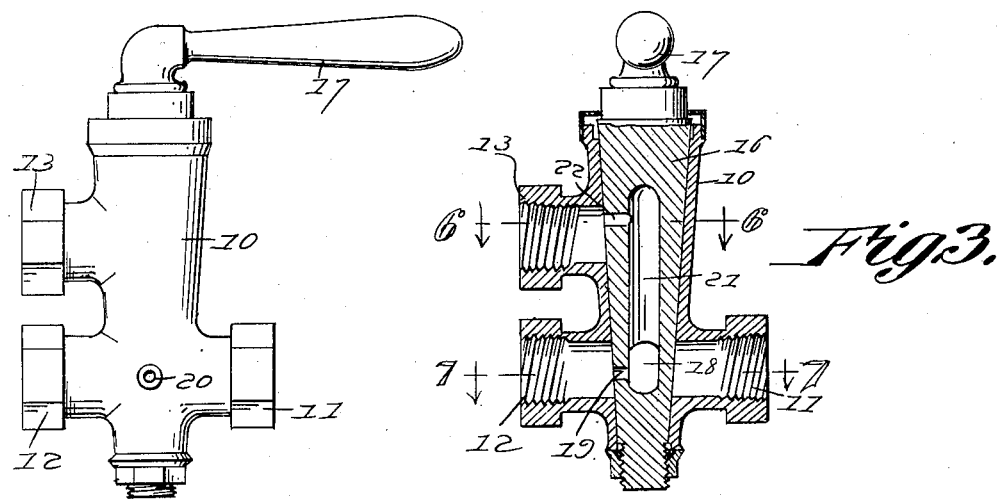
Fig. 2.
Fig. 3.
Inventor
T. J. Sullivan,
By
Attorney

T. J. SULLIVAN.
HOUSE SERVICE VALVE.
APPLICATION FILED JUNE 9, 1920.

1,384,645.

Patented July 12, 1921.
2 SHEETS—SHEET 2.

Inventor
T. J. Sullivan,
By
Attorney

UNITED STATES PATENT OFFICE.

TIMOTHY J. SULLIVAN, OF WARMSPRINGS, MONTANA.

HOUSE-SERVICE VALVE.

1,384,645.  Specification of Letters Patent.  Patented July 12, 1921.

Application filed June 9, 1920. Serial No. 387,661.

*To all whom it may concern:*

Be it known that I, TIMOTHY J. SULLIVAN, a citizen of the United States of America, residing at Warmsprings, in the county of Deerlodge and State of Montana, have invented new and useful Improvements in House-Service Valves, of which the following is a specification.

The object of the invention is to provide a valve for use in connection with house service water systems whereby both the hot and cold water circulating pipes may be drained simultaneously and effectively by a single adjustment of the valve corresponding with that ordinarily incident to the cutting off of communication with the cold water service main, to the end that the disadvantages incident to the necessity common in the ordinary practice of separately draining the hot water circulating system may be avoided; and with this object in view the invention consists in a construction and combination of which a preferred embodiment is shown in the accompanying drawings wherein:

Figure 1 is a diagrammatic view of a house service system embodying a cut off and drain valve constructed in accordance with the invention.

Fig. 2 is a detail side view of the valve.

Fig. 3 is a sectional view of the same adjusted to its draining or closed position.

Figure 4:
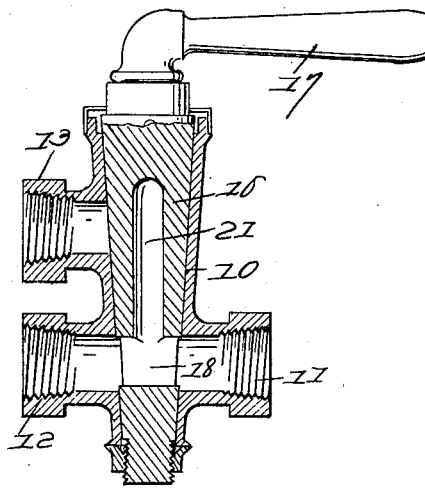
Fig. 4 is a similar view showing the valve plug in its open position.
Figure 5:
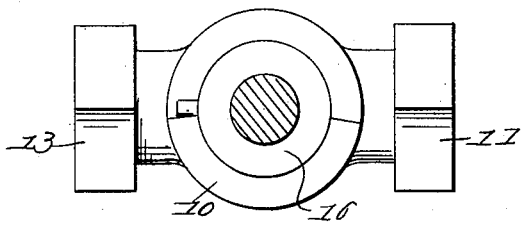
Fig. 5 is a top end view of the structure.
Figure 6:
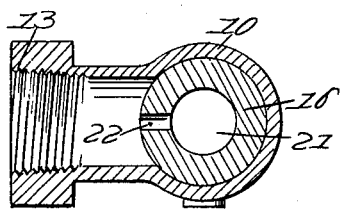
Figure 7:
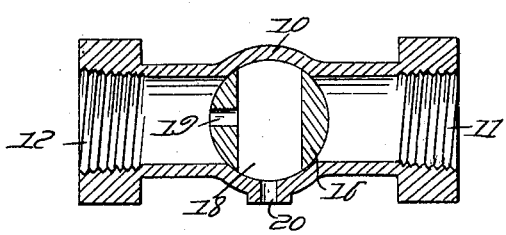

Figs. 6 and 7 are transverse sections on the planes indicated respectively by the lines 6—6 and 7—7 of Fig. 3.

The valve casing 10 is provided with the usual inlet or supply opening 11 and with a plurality of outlet or of service openings 12 and 13 designed for connection with the cold and hot water service pipes 14 and 15 as indicated in Fig. 1, and the valve plug 16 which is seated in the ordinary way in the casing and is adapted to be adjusted by means of the handle 17 or any equivalent means such as a key, to provide with the cored passage 18 which in the open adjustment serves to connect the inlet and outlet openings 11 and 12 of the casing as in the ordinary practice. Also the plug is provided with the usual drain port 19 adapted for registration with the outlet or the service opening 12 of the casing when the plug is in its closed position, or in other words when the passage 18 is out of registration with the inlet and outlet parts of the casing. In the side of the casing as also in the usual practice there is provided the usual vent 20 with which the passage 18 of the plug is adapted to register when the valve is in its closed position to permit of the drainage of water from the cold water service pipes of the building through the plug to the vent.

In addition to the indicated features of construction the plug is provided with a cored recess or channel 21 in communication at its lower end with the passage 18 and at its upper end with a drain port 22 adapted when the valve is in its closed position to register with the hot water connection 13.

Therefore when the valve plug is turned in the ordinary way to cut off communication between the casing and the branch pipe 23 leading from the water main, not only is the interior cold water service pipe 14 brought into communication with the draining port or vent 20 in the side of the valve casing, but simultaneous communication is established between the hot water service pipe 15 and the said vent through the port 22 and channel 21, to the end that the complete interior service system of the building is drained.

What is claimed is:

A valve for the purpose indicated consisting of a casing provided adjacent its lower end with an inlet and diametrically opposite said inlet with an outlet for connection to a cold water service pipe, the casing being provided above the outlet with an opening identical to the same and designed for connection to a hot water service pipe, a valve plug mounted in the casing and having a transversely cored passage, the casing being provided with a vent with which said passage may be brought into registration, the plug being formed with a drain port communicating with said passage and being further formed with a longitudinal channel and with a drain port opening into said channel adjacent the upper end, and means for imparting angular or turning movement to the plug whereby when the cored passage is in registration with the vent in the casing, the two aforesaid drain ports are respectively in registration with the hot and cold water service outlets, the turning of the plug shifting the cored passage out of registration with said vent and into registration with the inlet opening of the casing and with the cold water service outlet when the drain ports are moved out of registration with said casing outlets.

In testimony whereof I affix my signature.

TIMOTHY J. SULLIVAN.